United States Patent
Buchheit et al.

(10) Patent No.: US 9,110,846 B2
(45) Date of Patent: *Aug. 18, 2015

(54) METHODS AND SYSTEMS FOR SAVING DRAFT ELECTRONIC COMMUNICATIONS

(71) Applicant: Google Inc., Mountain View, CA (US)

(72) Inventors: Paul T. Buchheit, Los Altos, CA (US); Jing Yee Lim, Palo Alto, CA (US); Sanjeev Singh, South San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 14/199,928

(22) Filed: Mar. 6, 2014

(65) Prior Publication Data

US 2014/0188806 A1 Jul. 3, 2014

Related U.S. Application Data

(63) Continuation of application No. 11/094,763, filed on Mar. 31, 2005, now Pat. No. 8,694,589.

(51) Int. Cl.
*G06F 15/16* (2006.01)
*G06F 11/14* (2006.01)
*G06Q 10/10* (2012.01)

(52) U.S. Cl.
CPC .......... *G06F 11/1446* (2013.01); *G06Q 10/107* (2013.01)

(58) Field of Classification Search
USPC ............ 709/206; 455/574, 500; 715/224, 235
See application file for complete search history.

(56) References Cited

U.S. PATENT DOCUMENTS

| | | | |
|---|---|---|---|
| 5,675,507 A | 10/1997 | Bobo | |
| 5,774,670 A | 6/1998 | Montulli | |
| 5,832,530 A * | 11/1998 | Paknad et al. | 715/235 |
| 6,101,482 A * | 8/2000 | DiAngelo et al. | 705/26.62 |
| 6,182,108 B1 * | 1/2001 | Williams et al. | 718/102 |
| 6,185,551 B1 * | 2/2001 | Birrell et al. | 1/1 |
| 6,327,544 B1 | 12/2001 | Samuels | |
| 6,330,566 B1 | 12/2001 | Durham | |
| 6,356,937 B1 * | 3/2002 | Montville et al. | 709/206 |
| 6,374,359 B1 | 4/2002 | Shrader et al. | |

(Continued)

FOREIGN PATENT DOCUMENTS

EP 0886228 A2 12/1998

OTHER PUBLICATIONS

Bannan, E-mail with high performance, Sep. 23, 1996, 1 pg.

(Continued)

*Primary Examiner* — Tammy Nguyen
(74) *Attorney, Agent, or Firm* — Morgan, Lewis & Bockius LLP

(57) ABSTRACT

Methods and systems for saving draft electronic communications, such as web e-mails, are described herein. One such described method comprises automatically saving a draft web-email in the e-mail web page. A second such described method comprises saving a draft web e-mail in a cookie residing on the client machine. A third such described method comprises automatically saving a draft web e-mail at the host that provides the Web e-mail service. A fourth such described method comprises interacting with a central installed client component to save a draft web e-mail one the user's machine at the client side.

15 Claims, 9 Drawing Sheets

(56) References Cited

U.S. PATENT DOCUMENTS

| | | | |
|---|---|---|---|
| 6,385,529 B1 * | 5/2002 | Minowa et al. | 701/96 |
| 6,385,592 B1 | 5/2002 | Angles et al. | |
| 6,449,765 B1 | 9/2002 | Ballard | |
| 6,463,307 B1 * | 10/2002 | Larsson et al. | 455/574 |
| 6,557,038 B1 | 4/2003 | Becker et al. | |
| 6,651,217 B1 * | 11/2003 | Kennedy et al. | 715/224 |
| 6,701,454 B1 | 3/2004 | Fischer et al. | |
| 6,725,269 B1 | 4/2004 | Megiddo | |
| 6,774,921 B1 | 8/2004 | Tadman et al. | |
| 6,802,611 B2 * | 10/2004 | Chu et al. | 353/28 |
| 6,810,410 B1 | 10/2004 | Durham | |
| 6,811,490 B2 | 11/2004 | Rubin | |
| 6,836,895 B2 | 12/2004 | Hamlin | |
| 6,950,980 B1 | 9/2005 | Malcolm | |
| 6,963,903 B2 | 11/2005 | Krueger et al. | |
| 7,010,605 B1 | 3/2006 | Dharmarajan | |
| 7,103,230 B1 | 9/2006 | Jam et al. | |
| 7,111,234 B2 | 9/2006 | Peck et al. | |
| 7,149,791 B2 | 12/2006 | Sears, Jr. et al. | |
| 7,188,305 B1 | 3/2007 | Corbin et al. | |
| 7,288,305 B2 | 10/2007 | Perrier et al. | |
| 7,424,543 B2 | 9/2008 | Rice, III | |
| 7,634,688 B2 | 12/2009 | Madter et al. | |
| 2001/0042100 A1 | 11/2001 | Guedalia et al. | |
| 2002/0032743 A1 | 3/2002 | Lee et al. | |
| 2002/0103827 A1 | 8/2002 | Sesek | |
| 2002/0107885 A1 | 8/2002 | Brooks et al. | |
| 2002/0107886 A1 | 8/2002 | Gentner et al. | |
| 2002/0112010 A1 | 8/2002 | Soroker et al. | |
| 2003/0020744 A1 | 1/2003 | Ellis et al. | |
| 2003/0110445 A1 | 6/2003 | Khaleque | |
| 2003/0158776 A1 | 8/2003 | Landesmann | |
| 2003/0177447 A1 | 9/2003 | Newbury | |
| 2003/0182357 A1 | 9/2003 | Chess et al. | |
| 2004/0073667 A1 | 4/2004 | Hamilton et al. | |
| 2004/0078446 A1 | 4/2004 | Daniell et al. | |
| 2004/0117247 A1 | 6/2004 | Agrawal et al. | |
| 2004/0127232 A1 | 7/2004 | Kotzin | |
| 2004/0127241 A1 * | 7/2004 | Shostak | 455/500 |
| 2004/0128356 A1 | 7/2004 | Bernstein et al. | |
| 2004/0153973 A1 | 8/2004 | Horwitz | |
| 2004/0163020 A1 | 8/2004 | Sidman | |
| 2004/0168083 A1 | 8/2004 | Gasparini et al. | |
| 2005/0021570 A1 | 1/2005 | Thompson | |
| 2005/0125715 A1 | 6/2005 | Di Franco et al. | |
| 2005/0183003 A1 | 8/2005 | Peri | |
| 2005/0235034 A1 * | 10/2005 | Chen et al. | 709/206 |
| 2006/0036875 A1 | 2/2006 | Karoubi | |
| 2006/0075330 A1 | 4/2006 | Guido et al. | |

OTHER PUBLICATIONS

Google, ISR/WO, PCT/US06/09630, Nov. 7, 2006, 4 pgs.
WebMail basics, ITS, Tennessee Technological Univ., May 2003, 8 pgs.

* cited by examiner

Compose                                              900

To: johndoe@domain_name.extension                910

Cc: janedoe@domain_name.extension                920

Subject: Hello!                                  930 paragraph 1 .........................................    940
paragraph 2 .........................................
paragraph 3 .........................................
paragraph 4 .........................................

| Send | Save Draft | Cancel | | Attachments |

FIG. 9

METHODS AND SYSTEMS FOR SAVING DRAFT ELECTRONIC COMMUNICATIONS

RELATED APPLICATIONS

This application is a continuation of U.S. patent application Ser. No. 11/094,763, filed Mar. 31, 2005, which is hereby incorporated by reference in its entirety.

BACKGROUND OF THE INVENTION

1. Field of the Invention

The present invention relates generally to methods and systems for saving draft electronic communications. For example, embodiments of the present invention relate generally to methods and systems for automatically backing up a web-based e-mail while it is being drafted or composed to prevent accidental loss of its content.

2. Background

Since the advent of the Internet and other electronic data networks, electronic mail, often referred to as e-mail, has provided users of such networks with an alternative means of transmitting written communication that is easier and faster than the traditional postal mail. As known in the art, there are two primary approaches to using e-mail communication over a data network such as the Internet. The first and traditional approach is the mail-client approach, which typically involves the user installing a client e-mail program (e.g., Microsoft™ Outlook or Qualcomm™ Eudora) for an e-mail account on a user's machine (e.g., a desktop or laptop PC), configuring the program to a host service (e.g., an Internet Service Provider's service) that provides access to the data network, and subsequently using the installed program to draft, send, and receive e-mails. The second approach is the web e-mail approach, which typically involves the user accessing a designated Web site with a Web browser (e.g., Microsoft Internet Explorer™ or Netscape™) entering a username and password to access the user's e-mail account, and using such account to draft, send, and receive e-mails. With web e-mail, the user can access his/her e-mail account wherever web access is available and without the need to carry around his/her PC.

Although Web e-mail provides users with e-mail communication on the go, one disadvantage with Web e-mail is that when the user is drafting an e-mail on a dedicated web page and wishes to navigate the Web browser away from the e-mailing web page to a different web page or site, the content of the draft e-mail will be lost if the user has not selected to save the draft. Likewise, when the user is drafting an e-mail on a dedicated web page, and the Web browser or the machine on which the user is using crashes, the content of the draft e-mail also will be lost if the user has not selected to save the draft prior to the crash. Although mail-client programs, such as Microsoft™ Outlook and Qualcomm™ Eudora, are known to provide autosave features to automatically save an e-mail while it is being drafted, such autosave features are not found in Web e-mail.

SUMMARY OF THE INVENTION

Thus, there exists a need for a method and system that provide users of Web e-mail with a capability to automatically save draft e-mails so that the users do not have to constantly remember to save such drafts for back-up purposes. Accordingly, embodiments of the present invention provide methods and systems for saving draft electronic communications. For instance, exemplary embodiments of the present invention comprise a method and a computer-readable medium having encoded program code for: receiving a request to compose a web e-mail; responsive to the request, providing a web e-mail page for composing the web e-mail; receiving inputs to the web e-mail page; receiving a command to send the web e-mail; and periodically saving at least some of the received inputs prior to receiving the command to send the web e-mail.

The aforementioned embodiments are mentioned not to limit or define the invention, but to provide an example of embodiments of the invention to aid understanding thereof. Such exemplary embodiments are discussed in the Detailed Description, and further description of the invention is provided there. Advantages offered by the various embodiments of the present invention may be further understood by examining this specification.

BRIEF DESCRIPTION OF THE DRAWINGS

The embodiments of the present invention are illustrated by way of example in, and not limited to, the following figures:

FIG. 9 depicts a web e-mail compose window to show a working example in accordance with an embodiment of the present invention.

DETAILED DESCRIPTION OF THE INVENTION

Overview

As understood and referred herein, web-based e-mail or web e-mail refers to e-mail communication wherein users can use a web browser to access a web-based application to draft, send, and receive e-mails. Examples of services that provide free web-based e-mail communication include Hotmail™, Yahoo!™ Mail, and Netscape™ Mail. Many Internet Service Providers (ISPs) also provide their subscribers with the convenience of web e-mail service in conjunction with the traditional mail-client service. Web e-mail should be distinguished from e-mail communication that is accessible through a Web gateway to a mail-client application in the host server system. Although such e-mail communication can be performed with a Web browser, the Web browser is actually used to access the mail-client application, and not a web-based application used by web e-mail, to facilitate the e-mail communication.

System Architecture

Figure 1:
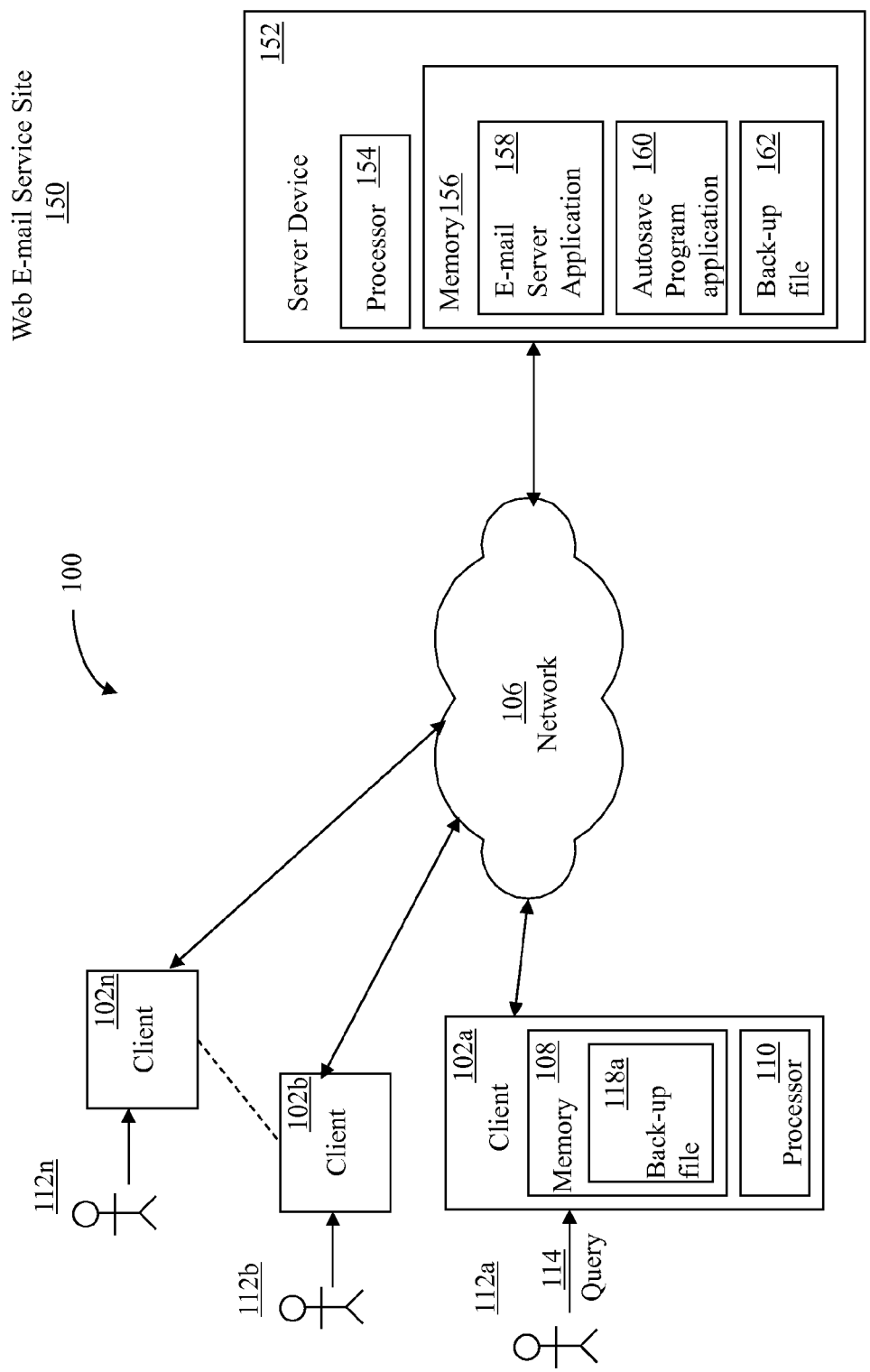
FIG. 1 depicts an exemplary environment in which an exemplary embodiment of the present invention may operate.

Various systems in accordance with the present invention may be constructed. FIG. 1 is a block diagram illustrating an exemplary system in which embodiments of the present invention can operate. The present invention may operate, and be embodied, in other systems as well.

Referring now to the drawings in which like numerals indicate like elements throughout the several figures, FIG. 1 is a block diagram illustrating an exemplary system in accordance with an exemplary embodiment of the present invention. Referring now to the drawings in which like numerals indicate like elements throughout the several figures, FIG. 1 is a block diagram illustrating an exemplary system in accordance with an exemplary embodiment of the present invention. The environment 100 shown in FIG. 1 includes multiple client devices 102a-n with users 112a-112n in communication with one another and with a web e-mail service or hosting site 150 over a network 106. The network 106 can be a wired or wireless network. Further, it can be a public network, e.g., the Internet, or a private data network, e.g., a local area network (LAN) or a wide area network (WAN). Moreover, the client devices 102a-n can be in communication directly with the web e-mail service site 150 without the use of the network 106.

Each of the client devices 102a-n includes a memory 108, which can be a computer-readable medium (CRM), such as a random access memory (RAM), coupled to a processor 110. The processor 110 executes computer-executable program instructions stored in the client device, such as memory 108, as program code. Such processor may include a microprocessor, an ASIC, and state machines. Such processors include, or may be in communication with, media, for example computer-readable media, which stores instructions that, when executed by the processor, cause the processor to perform the methods described herein. Moreover, the processor 110 can be any of a number of computer processors, such as processors from Intel Corporation of Santa Clara, Calif. and Motorola Corporation of Schaumburg, Ill.

Client devices 102a-n can also include a number of external or internal devices such as a mouse, a CD-ROM drive, a DVD drive, a keyboard, a display, or other input or output devices. Examples of client devices 102a-n are personal computers, digital assistants, personal digital assistants (PDAs), cellular phones, mobile phones, smart phones, pagers, digital tablets, laptop computers, Internet appliances, and other processor-based devices. In general, the client devices 102a-n can be any type of processor-based platform that operates on any operating system capable of supporting one or more client application programs.

The web e-mail service site 150 includes a server device 152 executing a web-based server application 158, which resides in memory 156, to provide web e-mail service to users at client devices 102a-n. Thus, a user 11a at client device 102a, for example, can use the available we e-mail service to correspond with any of the users 112b-112n at other client devices 102b-n or with the administrator at the web e-mail hosting 150. Similar to the client devices 102an-n, the server device 152 includes a processor 154 coupled to a memory 156, which can be a CRM. Examples of a server device 152 are servers, mainframe computers, networked computers, a processor-based device, and similar types of systems and devices. The server processor 154 can be any of a number of computer processors, such as processors from Intel Corporation of Santa Clara, California and Motorola Corporation of Schaumburg, Ill. In general, the server device 152 can be any type of processor-based platform that operates on any operating system capable of supporting one or more server application programs.

Embodiments of CRM for memory 156 include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, switch, private or public network, or other transmission device or channel, both wired and wireless. The instructions may comprise code from any suitable computer-programming language, including, for example, C, C++, C#, Visual Basic, Java, Python, Perl, and JavaScript.

Process

Various methods or processes in accordance with the present invention may be constructed. For example, in one embodiment, a user can access the web e-mail service site 150 to compose and send and e-mail. As the user composes the e-mail on the web site, i.e., provides inputs to the web e-mail page, the web e-mail service site 150 continuously receives the inputs and periodically provides automatic savings or back-ups of such inputs to the web e-mail page.

Referring now to the method depicted in FIG. 3, when a user opens up an e-mail compose window at 301, such as the window 200 shown in FIG. 2, the server device 152 executes an autosave program application 160 (hereinafter, "autosave application") to create an HTML form hidden in the background of the e-mail compose window 200 for storage in the temporary memory of the user's web browser at 302. An HTML form is a markup language document (e.g., SGML, HMTL, XML, etc.) or a section thereof that contains normal content, markup, and control elements (e.g., checkboxes, radio buttons, menus, text input, etc.). Users typically "complete" a form by modifying its controls (e.g., marking checkboxes, clicking on radio buttons, selecting menu items, entering text, etc.). In the first method, the HTML form sets up text inputs for the various input fields in the e-mail compose window 200 (e.g., "To" field 210, "Cc:" field 220, "Subject" field 230, and body text field 240). When the user enters text into one or more of the various fields in the e-mail compose window 200, the text inputs or values (i.e., the e-mail composition), are also received by the hidden HTML form, which are then automatically and periodically saved as a draft e-mail in the temporary memory of the user's web browser at 303A. The periodic autosave is performed while the user is composing/drafting the e-mail and/or before the user sends the e-mail. Alternative to periodically autosaving all text inputs or values in the draft e-mail, the autosave application 160 can perform periodic incremental autosave, wherein incremental changes to the draft e-mail as the user is composing, instead of the entire content of the draft e-mail, are sent to the temporary memory of the web browser to update the stored draft e-mail at 303B. If no change has been made since the last sent update, nothing will be sent in the next update to the temporary memory of the web browser.

Thus, when the user navigates away from the e-mail compose window or page 200 to another web page or site, the last-saved draft e-mail is retained in the temporary memory of the web browser. Should the user wish to return to the e-mail compose window/page 200, the draft e-mail is automatically retrieved from the temporary memory of the web browser and appears again on the e-mail window/page 200 as originally entered by the user. The aforementioned first embodiment can be applicable for users of web e-mail services that dynamically generate e-mail compose web pages (which prevents web browsers from saving inputs to those pages), or for any other reasons that such e-mail compose web pages do not get cached in the web browsers.

Figure 2:
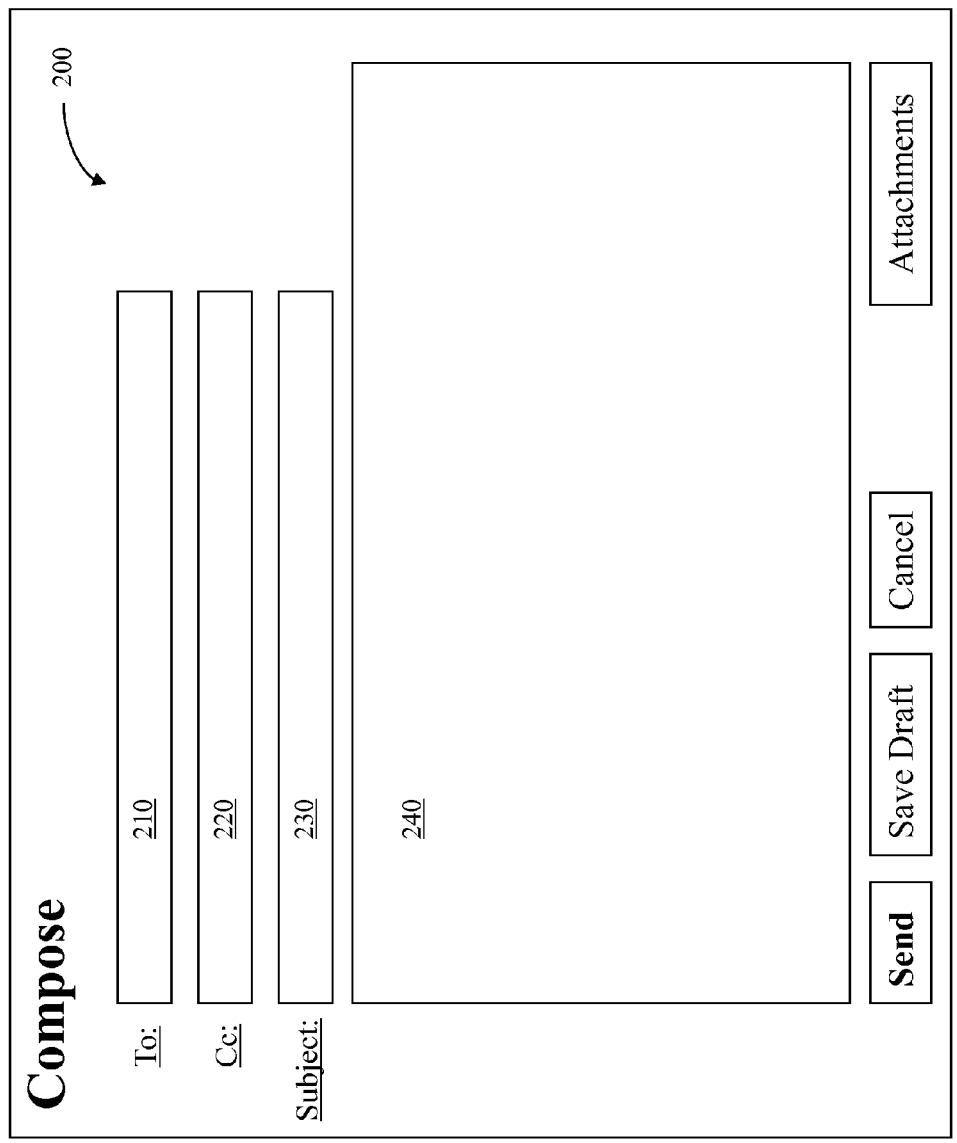
FIG. 2 depicts a web e-mail compose window in which an exemplary embodiment of the present invention may operate.
Figure 3:
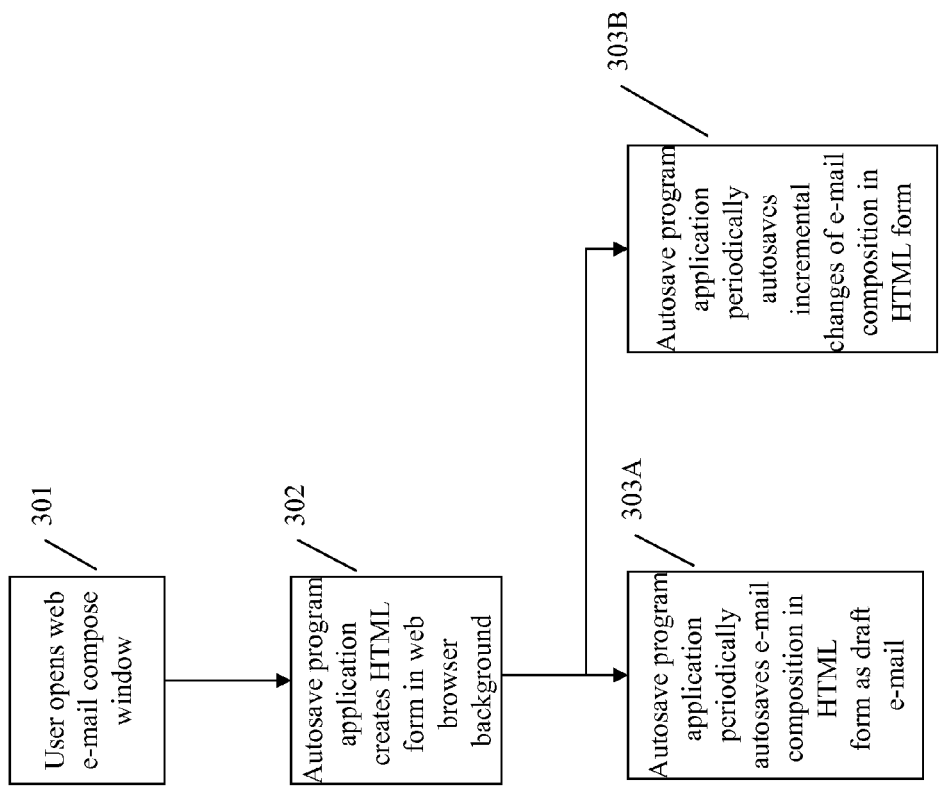
FIG. 3 depicts a flow diagram of a method for saving a draft web e-mail composition in accordance with an embodiment of the present invention.
Figure 4:
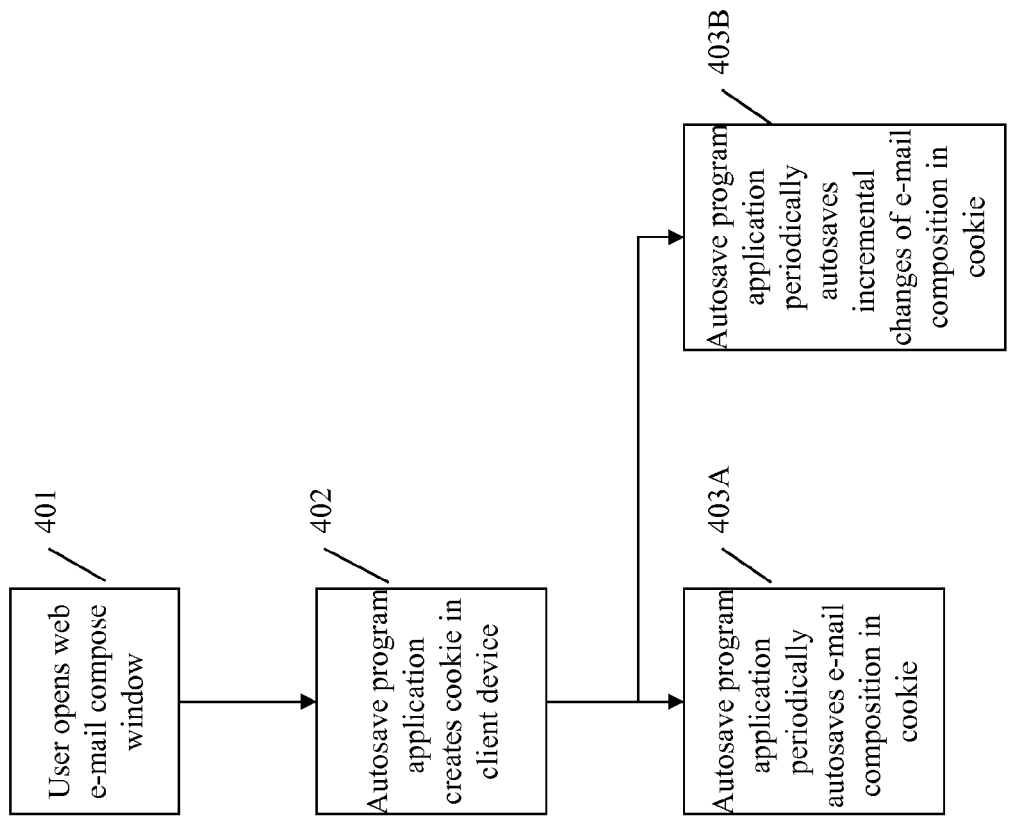
FIG. 4 depicts a flow diagram of a method for saving a draft web e-mail composition in accordance with another embodiment of the present invention.

In a second embodiment of the present invention as shown in FIG. 4, when a user opens up an e-mail compose window at 401, such as the window 200 shown in FIG. 2, the server device 152 executes an autosave program application 160 to create a cookie in the user's client device at 402 and to save the e-mail composition in such cookie at 403A. Hence, when a user enters text into one or more of the various input fields (e.g., fields 210, 220, 230, and 240) in the e-mail compose window/page 200, the autosave application 160 automatically and periodically saves a copy of such text inputs or values as a draft e-mail in a cookie residing on the user's client device. In this embodiment, the periodic autosave is performed while the user is composing/drafting the e-mail and/or before the user sends the e-mail. Alternative to periodically autosaving all text inputs or values in the draft e-mail, the autosave application 160 can perform periodic incremental autosave, wherein incremental changes to the draft e-mail as the user is composing, instead of the entire content of the draft e-mail, are sent to the cookie to update the stored draft e-mail at 403B. If no change has been made since the last sent update, nothing will be sent in the next update to the cookie.

The aforementioned second embodiment can be applicable for those instances where the web browser or the client device crashes. This is because once the draft e-mail is stored in a cookie that resides on the client device, the user can subsequently access the web e-mail service site 150 again after the crash, wherein the user will be given an option to retrieve the last-saved draft e-mail from the cookie to reconstruct the e-mail composition. The second embodiment also can be applicable for backing up those e-mail messages that do not exceed the maximum allotted size for a cookie. In instances where an e-mail message may be too large for complete saving in a cookie, the autosave program application 160 will select the most valuable or important inputs for saving in a cookie. To that effect, the autosave program application 160 includes programmed rules to determine the particular inputs that are to be saved. For instance, in the event that the cookie cannot save the entire e-mail message, the rules can specify that only inputs/values in the body text 240 will be saved; in another instance, the rules can specify that the inputs/values in the body text 240, starting from the top, are saved in the cookie up to a size limit of the cookie. Thus, whatever inputs/values in the e-mail compose window/page 200 can be saved as desired via the programming of the rules contained in the autosave application 160.

Figure 5:
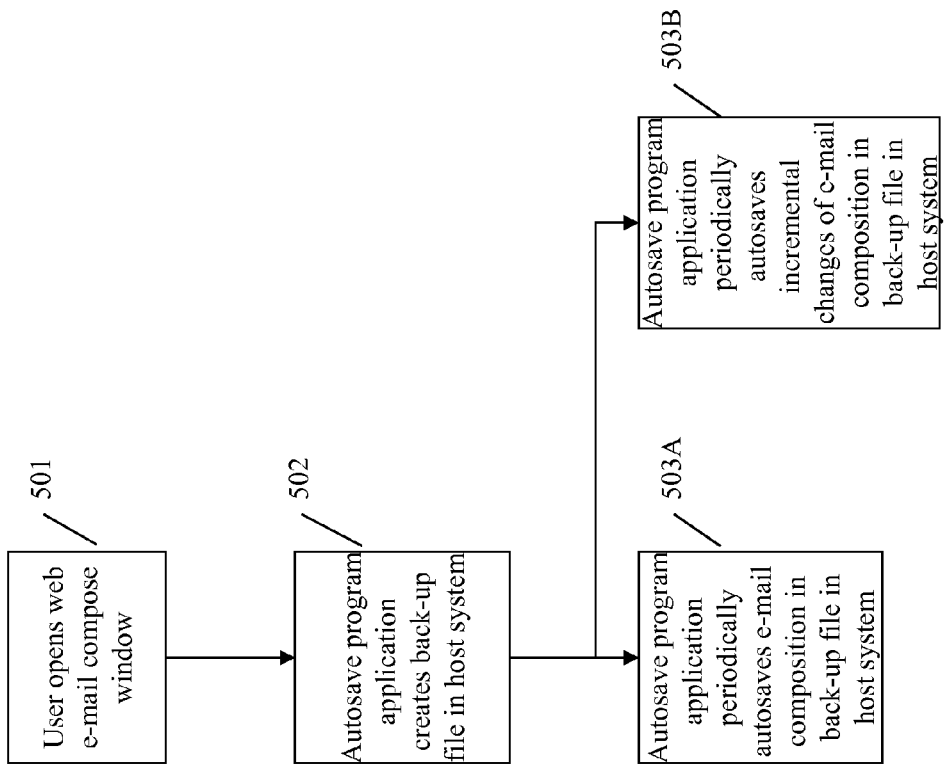
FIG. 5 depicts a flow diagram of a method for saving a draft web e-mail composition in accordance with another embodiment of the present invention.

In a third embodiment of the present invention as shown in FIG. 5, when a user opens up an e-mail compose window at 501, such as the window 200 shown in FIG. 2, the server device 152 executes an autosave program application 160 to create a back-up file (or database or any CRM) 162 in the host system 150 at 502 and to save the e-mail composition in such back-up file at 503A. Hence, when a user enters text into one or more of the various fields (e.g., fields 210, 220, 230, and 240) in the e-mail compose window/page 200, the autosave application 160 automatically and periodically saves a copy of such text inputs or values in the back-up file 162. The periodic autosave is performed while the user is composing/drafting the e-mail and/or before the user sends the e-mail. Thus, the user can retrieve the last-saved draft e-mail if it is lost for some reasons. Alternative to periodically autosaving all text inputs or values in the draft e-mail, the autosave application 160 can perform periodic incremental autosave, wherein incremental changes to the draft e-mail as the user is composing, instead of the entire content of the draft e-mail, are sent to the host system 150 to update the back-up file 162 at 503B. If no change has been made since the last sent update, nothing will be sent in the next update to the host system 150. This third embodiment can be applicable for backing up those e-mail messages that exceed the maximum allotted size for a cookie because the back-up file 162 does not have a size limitation as a cookie does.

Although FIG. 1 shows that the back-up file 162 resides in memory 156 of the server device 152, it should be understood that the back-up file 162 can reside in any memory area of the server device 162 or the search site 150.

Figure 6:
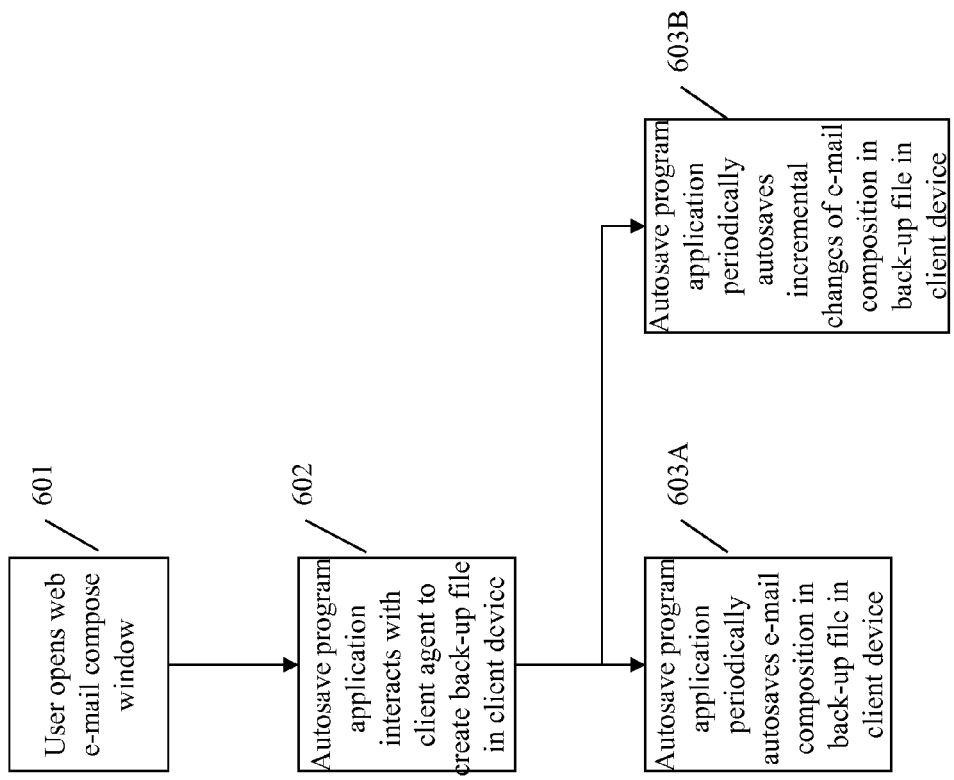
FIG. 6 depicts a flow diagram of a method for saving a draft web e-mail composition in accordance with another embodiment of the present invention.

In a fourth embodiment of the present invention as shown in FIG. 6, when a user, such as user 112a, opens up an e-mail compose window at 601, such as the window 200 shown in FIG. 2, the server device 152 executes an autosave program application 160 to interact with an existing software component or agent on the user's client device 102a to create a back-up file (or database or any CRM) 118a in the client device at 602 and to back up the draft e-mail in such back-up file at 603A, wherein the software component or agent has been installed on the client device prior to the e-mail composition. An agent is a software routine or component that waits in the background and processes and performs one or more actions as needed, e.g., when a specified event occurs. For instance, the client device may have installed an agent in the form of a search tool bar that enables files to be written to the client device. When a user enters text into one or more of the various fields (e.g., fields 210, 220, 230, and 240) in the e-mail compose window/page 200, the autosave application 160 takes advantage of the search tool bar to automatically and periodically save a copy of such text inputs or values as a draft e-mail in the back-up file 118a on the client device 102a instead of in a back-up file 162 on the host system 150. The periodic autosave is performed while the user is composing/drafting the e-mail and/or before the user sends the e-mail. Thus, the user can retrieve the last-saved e-mail if it is lost for some reasons. Alternative to periodically autosaving all text inputs or values in the draft e-mail, the autosave application 160 can perform periodic incremental autosave, wherein incremental changes to the draft e-mail as the user is composing, instead of the entire content of the draft e-mail, are sent to the client device to update the back-up file 118a at 603B. If no change has been made since the last sent update, nothing will be sent in the next update to the client device 118a. This fourth embodiment can be applicable for backing up those e-mail messages that exceed the maximum allotted size for a cookie because the back-up file 118a does not have a size limitation that is inherently present in a cookie.

above-mentioned embodiments for backing up e-mails can be implemented independently or jointly. For instance, a web e-mail service can offer one or more of the above-mentioned methods to its users when they open up or access their web e-mail accounts provided by the service, and each user can choose (or be given) one or more of the four methods that he/she prefers (or is given) to use to back up draft e-mails. When more than one of the above four embodiments are used jointly by the autosave program application 160, they can be used simultaneously to provide multiple back-ups of the same e-mail composition. Alternatively, these four embodiments can be used in a complementary fashion as described next.

Figure 7:
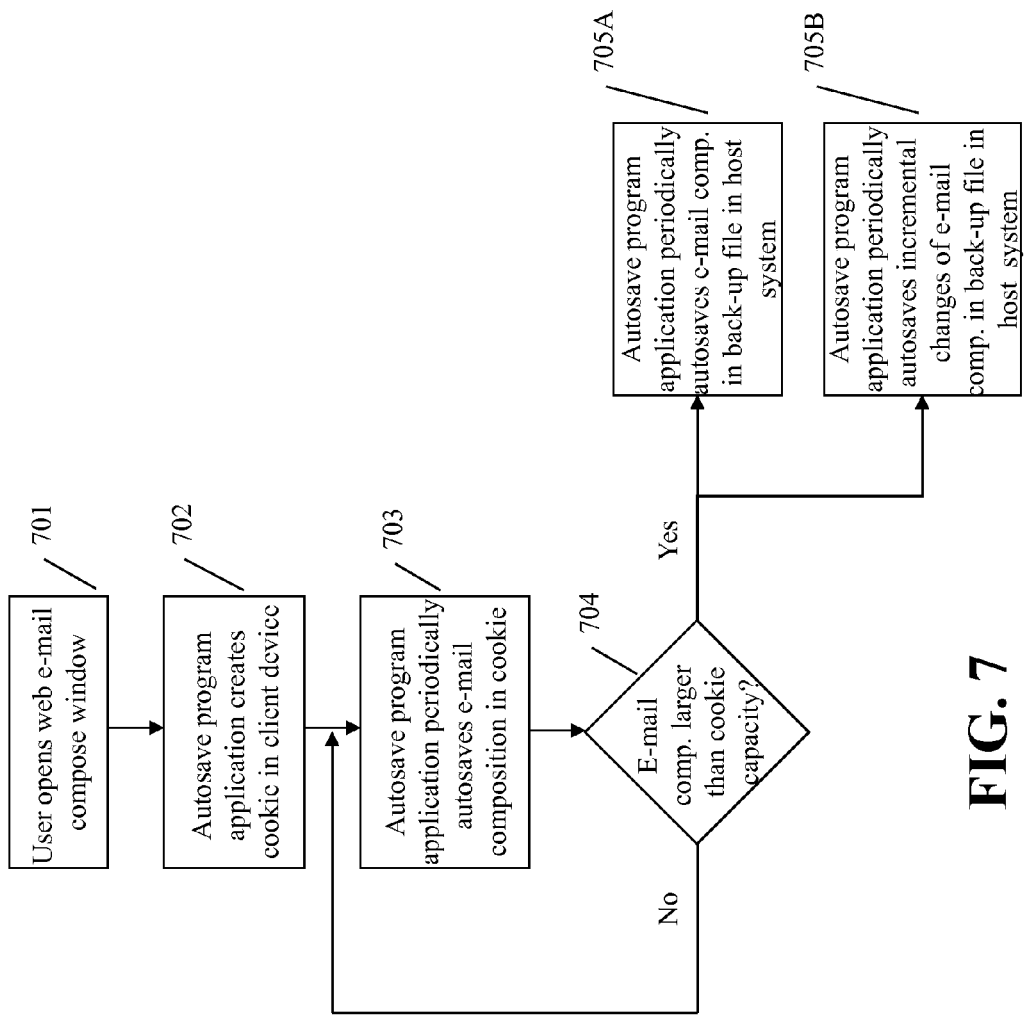
FIG. 7 depicts a flow diagram of a method for saving a draft web e-mail composition in accordance with another embodiment of the present invention.

In a fifth embodiment of the present invention as shown in FIG. 7, the second and third embodiments can be used complementary to back up draft e-mails. In this fifth embodiment, when a user opens up an e-mail compose window at 701, such as the window 200 shown in FIG. 2, the server device 152 executes an autosave program application 160 to create a cookie in the client device at 702 and to initially save the e-mail composition in such cookie at 703. Hence, when a user enters text into one or more of the various input fields (e.g., fields 210, 220, 230, and 240) in the e-mail compose window/page 200, the autosave application 160 automatically and periodically saves a copy of such text inputs or values in the cookie residing in the client device. However, once the autosave program application 160 determines during one of the periodic back-ups that the e-mail composition is becoming too large for storage in the cookie at 704, it can start backing up the e-mail composition in the back-up file 162 on the host system 150 at 705A or 705B as previously described in FIG. 5.

Figure 8:
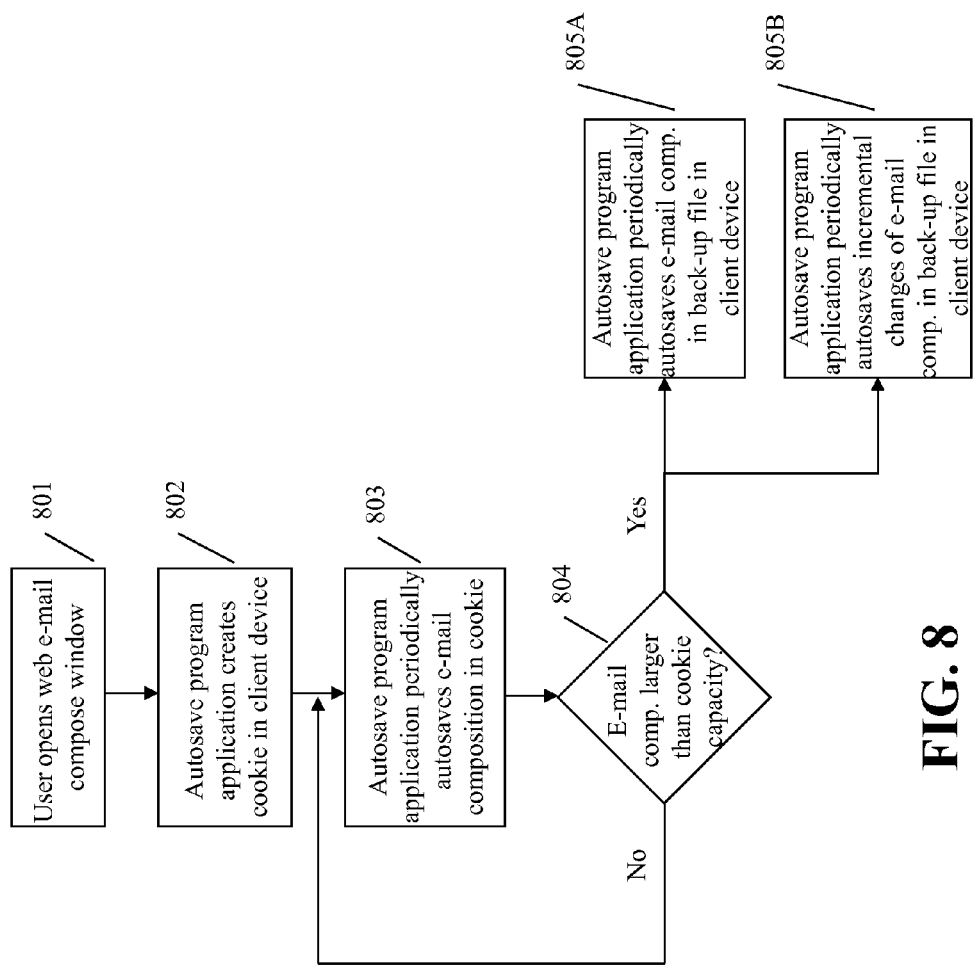
FIG. 8 depicts a flow diagram of a method for saving a draft web e-mail composition in accordance with another embodiment of the present invention.

Similarly, in a sixth embodiment of the present invention as shown in FIG. 8, the second and fourth embodiments can be used complementary to back up draft e-mails. In this sixth embodiment, when a user opens up an e-mail compose window at 801, such as the window 200 shown in FIG. 2, the server device 152 executes an autosave program application 160 to create a cookie in the client device at 802 and to initially save the e-mail composition in such cookie at 803. Hence, when a user enters text into one or more of the various input fields (e.g., fields 210, 220, 230, and 240) in the e-mail compose window/page 200, the autosave application 160 automatically and periodically saves a copy of such text inputs or values (i.e., e-mail composition) in the cookie residing in the client device. However, once the autosave program application 160 determines during one of the periodic back-ups that the e-mail composition is becoming too large for storage in the cookie at 804, it can start backing up the e-mail composition in the back-up file 118a on the client device through the use of the existing client software routine or agent at 805A or 805B, as previously described in FIG. 6.

EXAMPLE

Referring to FIG. 2, with reference to FIG. 1, a working example in accordance with an embodiment of the present invention is now provided. FIG. 2 shows an e-mail compose window 200 that a user 112a has opened up to draft an e-mail message. As mentioned earlier, and with reference to FIG. 1, when the e-mail compose window 200 is opened, an autosave program application 160 is executed to create a cookie in the client device 102a. As the user 112a enters text into one or more of the various fields 210, 220, 230, and 240 in the e-mail compose window 200, the autosave program application 160 can periodically autosave a copy of such text inputs or values in a hidden HTML form, in a cookie residing in the client device 102a, in a back-up file 118a residing in the client device, and/or in a back-up file 162 residing at the host system 150. As also mentioned earlier, the draft e-mail composition can be periodically autosaved in the cookie until it becomes too large for storage in the cookie. Then, only a predetermined portion of the e-mail composition is saved in the cookie and only up to the maximum allotted size for the cookie. For instance, the predetermined portion for saving can be: inputs in the fields 210, 220, and 230; inputs in the fields 210, 220, 230, and a portion of the inputs to the body-text field 240 up to the maximum allotted size for the cookie (e.g., only paragraphs 1 and 2 are saved); or just a portion or all of the inputs to the body-text field 240 up to the maximum allotted size for the cookie. Other examples can be apparent to one skilled in the art based on the present disclosure.

General

It should be noted that the autosave program application 160 in the above methods can comprise code from any suitable computer-programming language, including, for example, C, C++, C#, Visual Basic, Java, Python, Perl, and JavaScript.

Although the invention has been described with reference to these embodiments, other embodiments could be made by those in the art to achieve the same or similar results. Variations and modifications of the present invention will be apparent to one skilled in the art based on the present disclosure, and the present invention encompasses all such modifications and equivalents.

What is claimed:

1. A computer-implemented method performed by a host system having one or more processors, the method comprising:
    on the host system:
        sending a web e-mail page to a client system via a communications network, the web e-mail page including an input region for composing an e-mail message;
        prior to receiving from the client system, via the communications network, a user-initiated command to send the e-mail message,
            receiving inputs from the client system via the communications network, wherein the received inputs include text inputs made by a user while composing the e-mail message in the input region of the web e-mail page; and
            periodically auto-saving at the host system a backup copy of at least some of the received user text inputs to the web e-mail page, wherein the backup copy comprises a stored draft e-mail message; and
    wherein the method includes, at the host system, receiving incremental changes to the e-mail message as the user composes the e-mail message, and making corresponding incremental changes to the stored draft e-mail message.

2. The method of claim 1, including, at the host system, receiving user inputs to a plurality of distinct input fields of the web e-mail page, and saving the received user inputs to the plurality of distinct input fields of the web e-mail page in the backup copy.

3. The method of claim 2, including, at the host system, in response to a request from the client system, retrieving the backup copy, and sending the backup copy to the client system.

4. The method of claim 1 wherein the backup copy comprises a backup copy of the e-mail message being composed by the user in the input region of the web e-mail page.

5. The method of claim 1, including, at the host system, receiving incremental changes to the user inputs to the web e-mail page.

6. The method of claim 1, including, at the host system, receiving user inputs to a plurality of distinct input fields of the web e-mail page, and saving the received user inputs to the plurality of distinct input fields of the web e-mail page in the backup copy.

7. The method of claim 6, including, at the host system, in response to a request from the client system, retrieving the backup copy, and sending the backup copy to the client system.

8. A host computer system, comprising:
    a processor; and
    memory storing one or more programs, the one or more programs including instructions for:

prior to receiving from a client system, via a communications network, a user-initiated command to send an e-mail message composed in a web e-mail page that includes an input region for composing the e-mail message, receiving inputs from the client system via the communications network, wherein the received inputs include text inputs made by a user while composing the e-mail message in the input region of the web e-mail page; and periodically auto-saving at the host computer system a backup copy of at least some of the received user text inputs to the web e-mail page, wherein the backup copy comprises a stored draft e-mail message; and wherein the one or more programs include instructions for receiving, at the host computer system, incremental changes to the e-mail message as the user composes the e-mail message, and making corresponding incremental changes to the stored draft e-mail message.

9. The host computer system of claim 8, wherein the one or more programs include instructions for receiving, at the host computer system, user inputs to a plurality of distinct input fields of the web e-mail page, and saving the received user inputs to the plurality of distinct input fields of the web e-mail page in the backup copy.

10. The host computer system of claim 9, wherein the one or more programs include instructions for, at the host computer system, responding to a request from the client system by retrieving the backup copy and sending the backup copy to the client system.

11. The host computer system of claim 8, wherein the backup copy comprises a backup copy of the e-mail message being composed by the user in the input region of the web e-mail page.

12. The host computer system of claim 9, wherein the one or more programs include instructions for receiving, at the host computer system, incremental changes to the user inputs to the web e-mail page.

13. The host computer system of claim 10, wherein the one or more programs include instructions for receiving, at the host computer system, user inputs to a plurality of distinct input fields of the web e-mail page, and saving the received user inputs to the plurality of distinct input fields of the web e-mail page in the backup copy.

14. The host computer system of claim 13, wherein the one or more programs include instructions for responding to a request from the client system by retrieving the backup copy, and sending the backup copy to the client system.

15. A non-transitory computer readable storage medium storing one or more programs for execution by a host computer system, the one or more programs including instructions for:

prior to receiving from a client system, via a communications network, a user-initiated command to send an e-mail message composed in a web e-mail page that includes an input region for composing the e-mail message, receiving inputs from the client system via the communications network, wherein the received inputs include text inputs made by a user while composing the e-mail message in the input region of the web e-mail page; and periodically auto-saving at the host computer system a backup copy of at least some of the received user text inputs to the web e-mail page, wherein the backup copy comprises a stored draft e-mail message; and wherein the one or more programs include instructions for receiving, at the host computer system, incremental changes to the e-mail message as the user composes the e-mail message, and making corresponding incremental changes to the stored draft e-mail message.

* * * * *